(12) United States Patent
Teymour Ghasemabadi et al.

(10) Patent No.: US 10,574,086 B2
(45) Date of Patent: Feb. 25, 2020

(54) NONLINEAR CONTROL ALGORITHM AND SYSTEM FOR A SINGLE-PHASE AC-AC CONVERTER WITH BIDIRECTIONAL ISOLATED DC-DC CONVERTER

(71) Applicant: Rhombus Energy Solutions, Inc., San Diego, CA (US)

(72) Inventors: Hamid Reza Teymour Ghasemabadi, Dearborn, MI (US); Gholamreza Esmalli, San Diego, CA (US)

(73) Assignee: RHOMBUS ENERGY SOLUTIONS, INC., San Diego, CA (US)

( * ) Notice: Subject to any disclaimer, the term of this patent is extended or adjusted under 35 U.S.C. 154(b) by 194 days.

(21) Appl. No.: 15/483,882

(22) Filed: Apr. 10, 2017

(65) Prior Publication Data

US 2017/0294777 A1    Oct. 12, 2017

Related U.S. Application Data

(60) Provisional application No. 62/320,393, filed on Apr. 8, 2016.

(51) Int. Cl.
*H02J 9/06* (2006.01)
*H02M 5/458* (2006.01)
*H02M 3/335* (2006.01)

(52) U.S. Cl.
CPC ............. *H02J 9/062* (2013.01); *H02M 5/458* (2013.01); *H02J 2009/063* (2013.01); *H02M 3/335* (2013.01)

(58) Field of Classification Search
None
See application file for complete search history.

(56) References Cited

U.S. PATENT DOCUMENTS

| | | | | |
|---|---|---|---|---|
| 5,343,079 A * | 8/1994 | Mohan | ..................... | H02J 9/062 307/105 |
| 2001/0001535 A1* | 5/2001 | Johnson, Jr. | ............ | H02J 9/061 323/282 |
| 2002/0109412 A1* | 8/2002 | Johnson, Jr. | ............ | H02J 9/061 307/66 |
| 2005/0213357 A1* | 9/2005 | Paatero | ..................... | H02J 9/062 363/95 |
| 2007/0064363 A1* | 3/2007 | Nielsen | ................... | H02J 9/061 361/90 |
| 2008/0130182 A1* | 6/2008 | Anderson | ............. | H02M 7/493 361/78 |

(Continued)

*Primary Examiner* — Rexford N Barnie
*Assistant Examiner* — David A Shiao
(74) *Attorney, Agent, or Firm* — Jonathan Kidney; Intelink Law Group PC (57) ABSTRACT

A control system and hardware with a controllable input relay provides two different modes of operation—uninterruptable power supply (UPS) and mixed energy-AC support. For each operation mode, regulation of the DC-Link and neutral point balancing is guaranteed even for non-linear unsymmetrical AC loads. Moreover, in the mixed energy-AC support mode, unity power factor operation of AC input source, seamless zero current crossing, and very low total harmonic distortion (THD) is provided by the applied non-linear control algorithm. The system has a higher efficiency in comparison to other AC-DC-AC converters with smaller size and weight because of the elimination of the typical balancing circuit.

18 Claims, 8 Drawing Sheets

(56) References Cited

U.S. PATENT DOCUMENTS

| | | | |
|---|---|---|---|
| 2010/0026093 A1* | 2/2010 | Bleus | H02J 9/062 307/24 |
| 2011/0127837 A1* | 6/2011 | Sato | H02J 9/062 307/66 |
| 2011/0227418 A1* | 9/2011 | Pyboyina | H02J 9/062 307/75 |
| 2013/0076141 A1* | 3/2013 | Paulakonis | H02J 7/345 307/66 |
| 2016/0006295 A1* | 1/2016 | Yang | H02J 9/062 307/66 |
| 2017/0005471 A1* | 1/2017 | Kim | H02J 3/32 |
| 2017/0117749 A1* | 4/2017 | Fang | H02J 7/0068 |

* cited by examiner

FIG. 3C

NONLINEAR CONTROL ALGORITHM AND SYSTEM FOR A SINGLE-PHASE AC-AC CONVERTER WITH BIDIRECTIONAL ISOLATED DC-DC CONVERTER

CROSS-REFERENCE TO RELATED APPLICATION(S)

This application claims the benefit of U.S. Provisional Patent Application No. 62/320,393, filed Apr. 8, 2016, the contents of which are hereby incorporated by reference in its entirety.

FIELD

This invention relates to AC-AC power conversion control. More particularly, it relates to control of an AC-AC converter with bidirectional DC control.

BACKGROUND

In conventional AC-DC-AC converter systems with a neutral point, an extra balancing circuit, called balancer, is required to keep the DC-link and neural point balanced. Having the balancer as an additional circuit in the power conversion process, reduces the overall port-to-port efficiency, increases complexity, cost, and size. Therefore, there has been a long-standing need in the industry for system(s) and method(s) that address the above deficiencies in the art.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a power conversion control system is provided, comprising: an AC grid input; a controllable AC relay coupled to the AC grid input, and switchable between the AC grid input and a common system ground; a DC source input; bi-directional switches coupled to the DC source input; an isolated DC/DC converter with a switchable output, coupled to the bi-directional switches; a DC-link with a plurality of legs with at least one controllable input and output switche(es), the DC link coupled to an output of the AC relay, and a common DC-link leg of the DC-link coupled to the switchable output of the DC/DC converter, wherein the DC-link is operated as an inverter; a controller, providing at least one of switching signals to switches of the system and controlling power based on a non-linear modification of an upper and lower half of the DC-link voltage and a desired total DC-link voltage; and an output circuit, adapted to provide power form the DC Link to a load.

In another aspect of the disclosed embodiments, the above system is provided, wherein the AC grid is single phase; and/or wherein the bi-directional switches is a H-bridge; and/or the DC-DC converter is a unidirectional DC-DC converter; and/or wherein the controller provides power factor controller capabilities; and/or further comprising an additional power factor controller, added in parallel to the controller; and/or further comprising an additional inverter added to a leg of the DC-link; and/or wherein the system provides at least one of an uninterruptable power supply (UPS) mode operation and a mixed energy-AC support mode of operation; and/or wherein the controller controls an operation of the input relay to provide an uninterruptable power supply (UPS) mode operation and a mixed energy-AC support mode of operation; and/or wherein regulation of the DC-link and neutral point balancing is maintained to provide a total DC ripple of less than 1% for non-linear unsymmetrical AC loads; and/or wherein the non-linear operation results in at least one of unity power factor operation of AC grid input, seamless zero current crossing, and very low total harmonic distortion (THD); and/or wherein the non-linear modification of the upper and lower half of the DC-link voltage and the desired total DC-Link voltage, comprises a phase lock loop signal portioned into half waves, multiplied into an output of a Proportional-Integral (PI) controller, the PI controller receiving squared values of the upper and lower half of the DC-link voltage and the desired total DC-Link voltage, wherein a resulting signal is an input current command (Iin-ref) to provide unity power factor operation; and/or further comprising a plurality of PI controllers; and/or wherein the Iin-ref signal is further modified by an AC relay current (Iin), a proportioned (K) Iin, proportionally-integrated, AC grid input voltage, and limited to result in a binary signal for operation of a leg switch(es) in the DC-link; and/or further comprising an AC grid connected to the AC grid input; and/or further comprising a load connected to the output circuit; and/or wherein the AC grid is a three-phase line.

In yet another aspect of the disclosed embodiments, a method for controlling an AC-AC converter with bidirectional isolated DC-DC converter, power conversion system is provided, comprising: adding a controllable AC relay coupled to an AC grid input of the system, the AC relay being switchable between the AC grid input and a common system ground; controlling an operation of switches in the system and controlling power in the system based on a non-linear modification of an upper and lower half of a DC-link voltage and a desired total DC-Link voltage.

In another aspect of the disclosed embodiments, the above method is provided, wherein the non-linear modification of the upper and lower half of the DC-link voltage and the desired total DC-Link voltage, comprises a phase lock loop signal portioned into half waves, multiplied into an output of a Proportional-Integral (PI) controller, the PI controller receiving squared values of the upper and lower half of the DC-link voltage and the desired total DC-Link voltage, wherein a resulting signal is an input current command (Iin-ref) to provide unity power factor operation; and/or wherein the Iin-ref signal is further modified by an AC relay current (Iin), a proportioned (K) Iin, proportionally-integrated, AC grid input voltage, and limited to result in a binary signal for operation of a leg switch(es) in the DC-link.

DETAILED DESCRIPTION

Figure 1A:
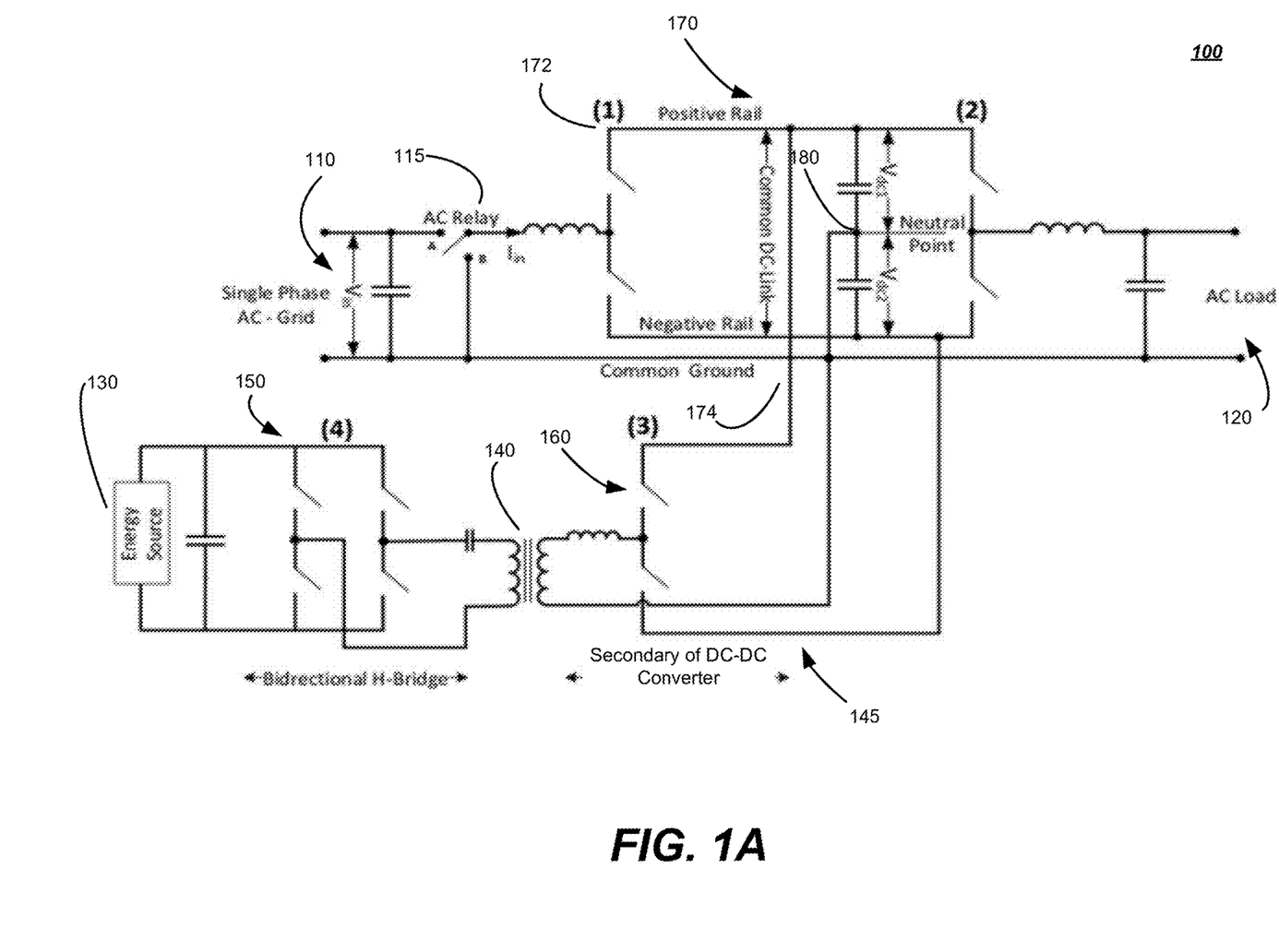
FIG. 1A is an exemplary circuit topology.

FIG. 1A is an exemplary circuit topology 100, illustration the capabilities of supporting AC load 120 side from input(s) AC grid 110 and DC energy source 130 such as battery, or a mixture of both at any given time. While FIG. 1A illustrates a single-phase system, it is understood that multiple phases may be provided by appropriate duplication of the topology. In some embodiments, various components may not need to be duplicated, being shared across different phase operations. Thus, it understood that the exemplary embodiments shown herein, may be modified to multiple/3-phase, etc. with little relative effort by the practitioner.

A DC-DC converter 140 with a front end switching network 150 (shown here as a bidirectional H-Bridge), is connected to the DC energy source 130, and coupled to the AC load 120 via intermediate switches 160 to a load-side half-bridge switching network 170, referred to in the industry as an inverter. The transformer in the DC-DC converter 140 provides isolation between the DC energy source 130 and the output AC load 120. The AC Grid 110, the AC Load 120, secondary 145 of the DC-DC converter 140, and the common DC-Link 180 share a common ground. Also, a controllable AC relay 115 with Normally Close (NC), position A, is used to switch to neutral point (180) of the common DC-Link and load side half-bridge 170 from the AC grid 110 hot line (A) to AC grid 110 neutral line (position B). The AC relay 115 can be any type of switching device, non-limiting examples being solid-state or conventional mechanical relays.

As can be seen from the circuit topology 100, the "center point" of the half-bridge 170 leg #3 (174) is also connected to the center point of the common DC-Link 180, and secondary winding of the transformer 140. The bridging legs of intermediate switches 160 are controllably switchable and may be physical switches or semiconductor or equivalent electronic switches.

In operation, when AC load 120 is supported by the AC grid 110, the AC relay 115 is in position A, therefore leg #1 (172), based on an exemplary control algorithm described below, will be used partially to balance the common DC-Link 180. Meanwhile, the half-bridge leg #3 (174) is used to charge the DC power source 130 at a capacity less than full rating of the DC-DC converter 140. In the mixed mode, for example for peak shaving or load leveling, leg #1 (172) can be used to balance the common DC-Link 180 as well as transferring power from AC grid 110 to the AC load 120. Meanwhile, leg #3 (174) of the DC-DC converter 140 is used to shave or level the load using DC energy source 130.

For operation in an Uninterruptable Power Supply (UPS) mode, in which the AC load 120 is supported only by the DC-DC converter 140 and AC grid 110 is not available, leg #1 (172) of the input power factor correction (PFC) converter is used to balance the common DC-Link 180 using a simple Proportional-Integrator (PI) controller. In UPS mode, the AC relay 115 is in position B, whereas, for the mixed energy and AC support mode of operation, AC relay 115 is in position A. In the mixed energy and AC support mode, a nonlinear control algorithm is used to balance the DC-link 180 as well as unity power factor control. This approach regulates the DC-link 180 and keeps the DC-link 180 constant, keeps the neutral point balanced, and provides unity power factor operation.

It should be understood that in some embodiments, the DC-DC converter 140 may be replaced with a unidirectional DC-DC converter with a similar secondary circuit to support a load in the UPS mode, as well as, balancing the common DC-Link 180 in the AC-AC conversion and energy mixture modes. Additionally, for a higher power application, it is anticipated that additional PFC circuits can be added to the existing PFC in parallel in the same structure as of the existing PFC. Further, for a higher power application, an additional inverter can be added to the existing system in parallel with leg #2. Similarly, it is understood that various electrical circuit elements (e.g., inductors, capacitors, switches and so forth) and/or connections (e.g., series, parallel, and so forth) may be instituted, changed, removed, modified, etc. without departing from the spirit and scope of this disclosure.

Figure 1B:
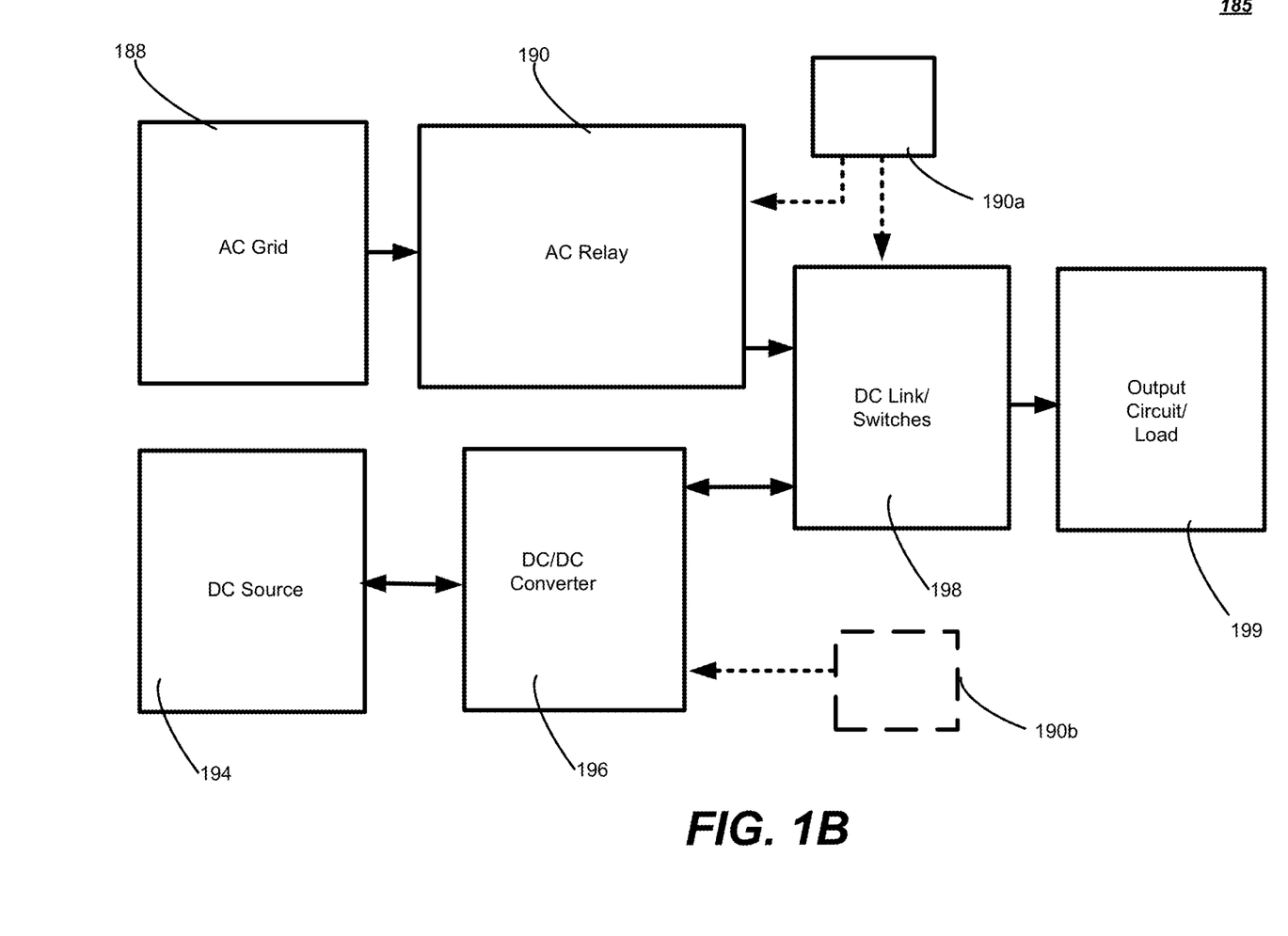
FIG. 1B is a functional block diagram of the FIG. 1A.

FIG. 1B is a simplified functional block diagram 185 of FIG. 1A with associated hardware controllers for switching and signaling. AC grid power 188 is coupled to a controllable AC relay 190 having a relay control signal from controller 190a. Controller 190a may be a software controlled device, such as a digital signal processor (DSP), computer, microcontroller, microprocessor and so forth. Input of the AC relay 190 either is coupled to the midpoint of the common DC-link 198 or the hot line of the AC grid 188, output of the AC relay 190 is connected to switching leg #1 (See FIG. 1A). Here, controller 190a is configured to provide pulse width control signals to the switching leg #1. In some embodiments, it may be desirable to have another separate controller, according to design preference. Further, other forms of signaling that are not pulse width may be used.

DC source 194 is fed to DC-DC Converter 196 with bi-directional switches, the output of which is fed to DC-Link 198. A controller (shown here as 190b) controls the operation of the bi-directional switches and any other switches in the DC-DC converter 196 module. Controller 190b may simply be controller 190a, depending on design preference. The output of the DC-Link 198 is fed to the output circuit/load 199. As will be evident below, the exemplary system provides a very elegant approach for controlling the DC-Link voltage and AC load voltage when an AC grid and DC source are utilized.

Figure 2A:
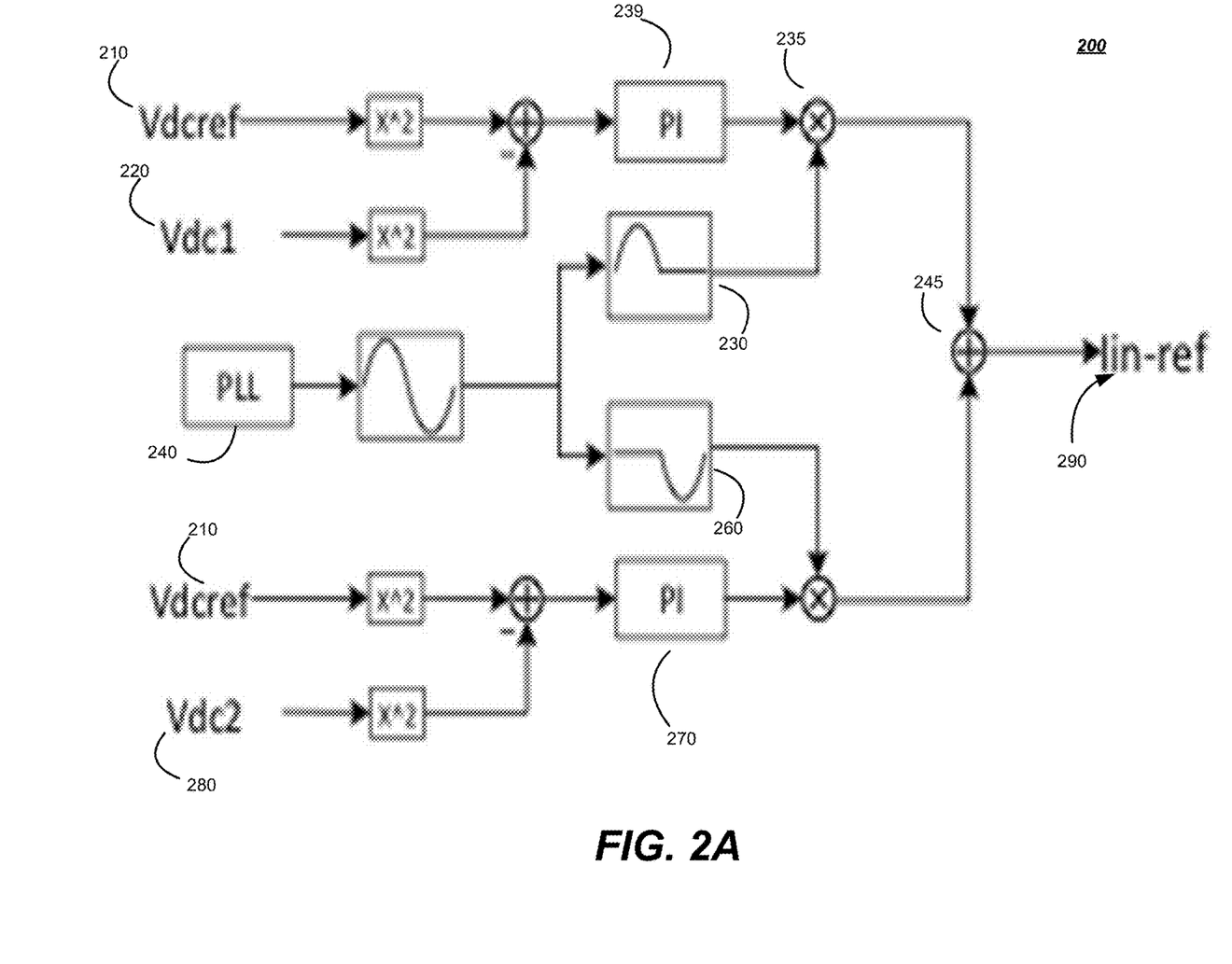
FIG. 2A is an exemplary control block diagram showing the parameters algorithmically affected to control the exemplary topology of FIG. 1A.
Figure 2B:
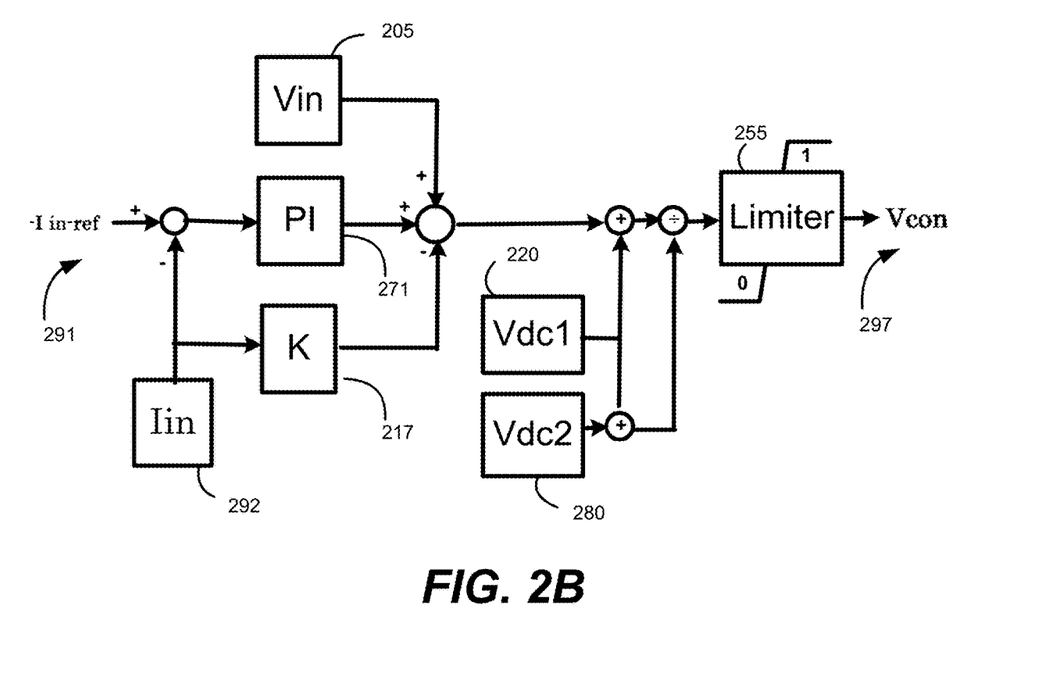
FIG. 2B is another exemplary control block diagram.
Figure 2C:
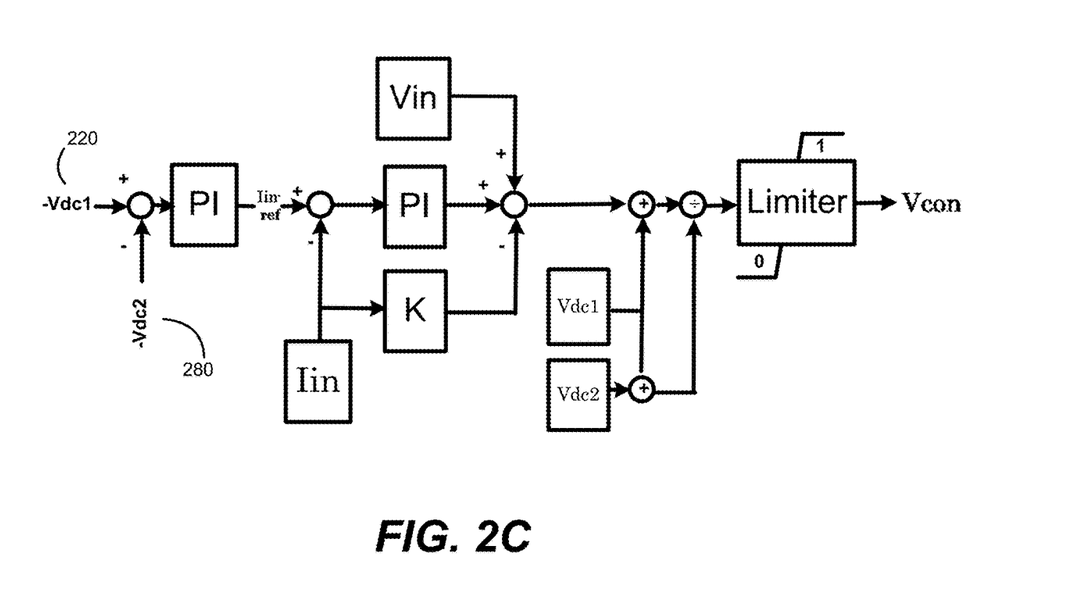
FIG. 2C is another exemplary control block diagram.

FIGS. 2A-C are control block diagrams showing the parameters affected to control the exemplary topology of FIGS. 1A & 1B. In FIG. 2A, Vdc1 (220) and Vdc2 (280) are the upper and lower half, respectively, of the DC-Link voltage with respect to the neutral point. Vdcref (210) is the desired total DC-Link voltage, which the control system provides through the exemplary control algorithm. Iin-ref (290) is the input current command used in FIG. 2B to provide unity power factor operation, DC-Link voltage regulation, and keep the neutral point balanced. An exemplary non-linear control algorithm is demonstrated in FIGS. 2A & B in which Vdcref 210 is squared and summed with the negative of Vdc1 squared 220. The summed output is then passed through a Proportional-Integral (PI) Controller 239 and multiplied 235 by a positive half-wave sine waveform 250 generated by a phase lock loop (PLL) signal 240 locked to the input AC grid. The output of the multiplier 235 is fed to a summer 245. Vdcref 210 is squared and summed with the negative of Vdc2 220 squared. The summed output is then passed through PI controller 270 and multiplied by a negative half-wave sine waveform 260 generated by the same phase lock loop (PLL) signal 240. The output of the multiplier 235 is fed to the summer 245. The resulting signal is the Iin-ref (290) signal, which is fed to an internal current loop described in FIG. 2B.

In FIG. 2B, Iin-ref 291 is subtracted by actual Iin 292 and is fed to another proportional-integral controller 271. Output of the PI controller 271 is summed up by Vin 205 and fraction of −Iin (K (217) being the fraction factor), to result in a non-normalized control signal. This is then normalized by Vdc1 220 and Vdc2 280 and passed through a limiter block 255 to ensure the output is a signal between zero and 1. This signal is called duty cycle or Vcon 297 to be used to turn-on and turn-off the upper and lower switches in leg #1 (see FIG. 1A).

FIG. 2C is another modification of FIG. 2B's algorithm for UPS mode of operation, but with the input signal first created from negative sums of Vdc1 220 and Vdc2 280, operated on by a PI, prior becoming an input Iin-ref signal. Since FIG. 2C is similar to FIG. 2B, its operations are understood to be self-explanatory.

Figure 3A:
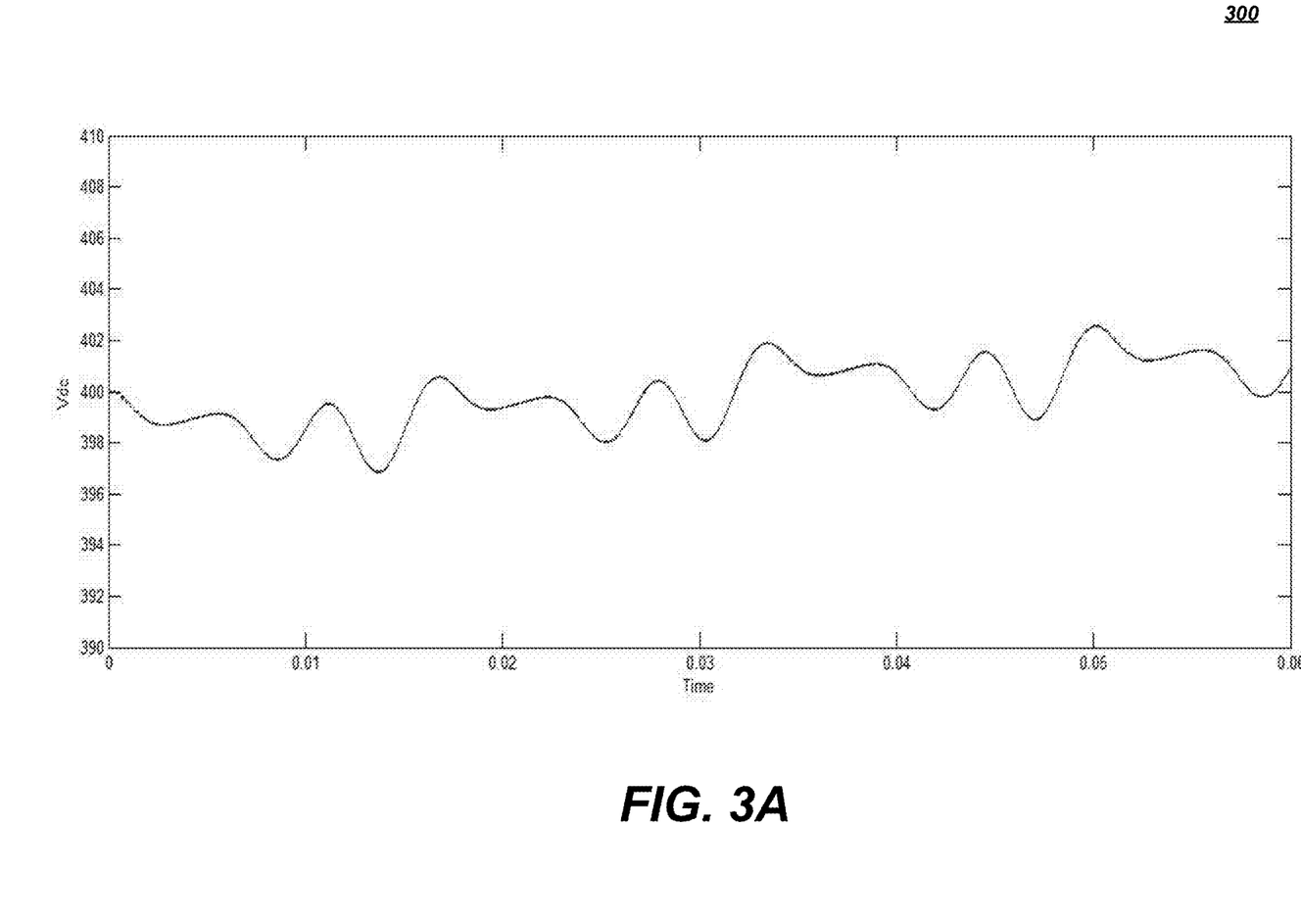
FIG. 3A is a plot of a simulation run for Vdc as a function of time.

FIG. 3A is a plot 300 of a simulation run for Vdc, which is the total DC-Link voltage, as a function of time, measured between positive and negative rails as seen in FIG. 1A showing the results based on control block diagrams in FIGS. 2A & B, which is in a mixed energy and AC support mode. As can be seen, from FIG. 3A, the total DC-Link voltage is controlled to be +/−2 Volts from the desired 400 VDC, which means the total ripple DC voltage is less than 1%.

Figure 3B:
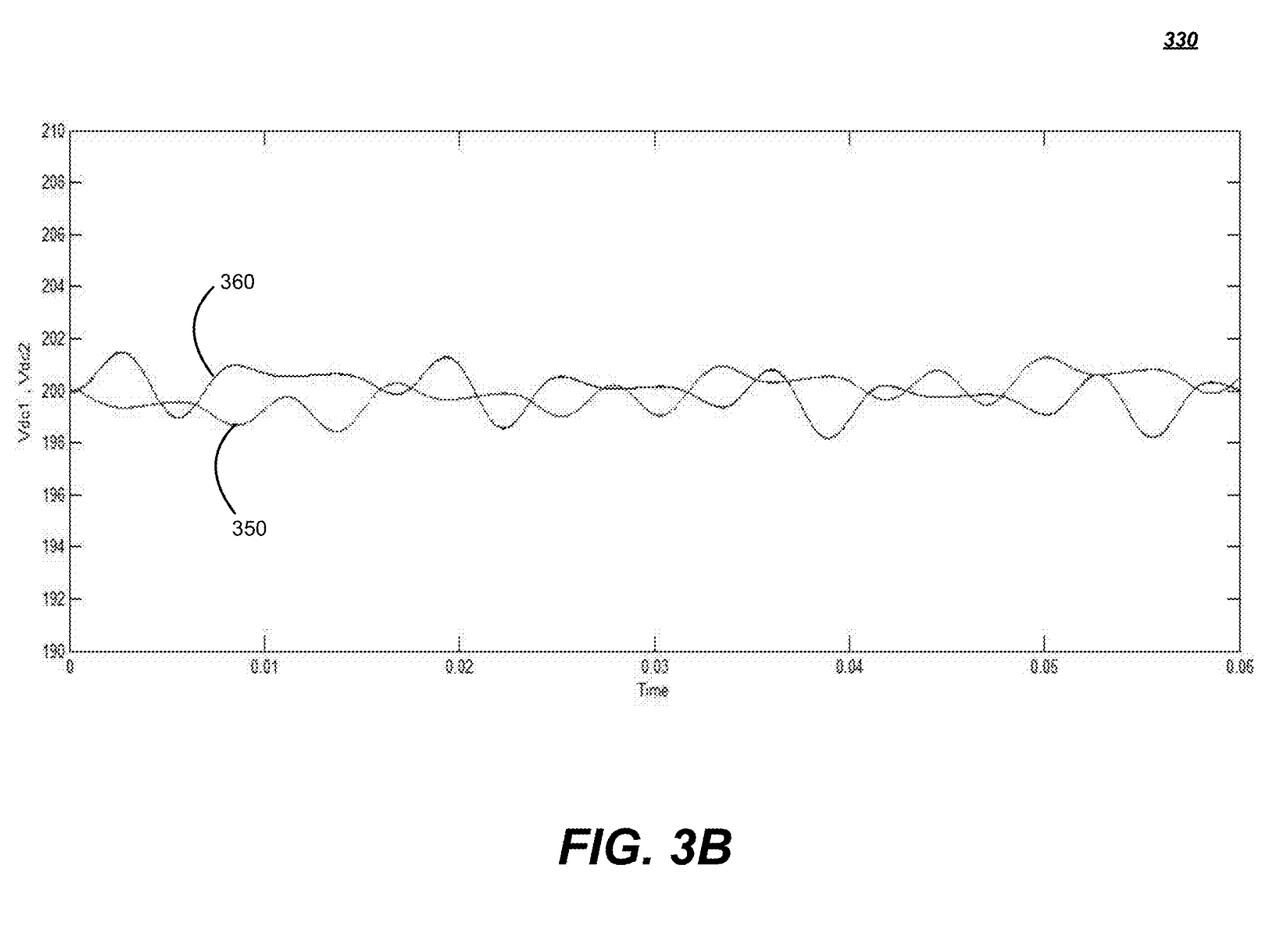
FIG. 3B is a plot of a simulation run showing Vdc1 and Vdc2 values as a function of time.

FIG. 3B is a plot 330 of a simulation run showing Vdc1 and Vdc2 values, as a function of time again for mixed energy and AC support mode. Vdc1 350 is measured between the positive rail and the neutral point and Vdc2 360 is measured between the neutral point and the negative rail shown in FIG. 1A. As can be seen from FIG. 3B, Vdc1 and Vdc2 are less than +/−2 Volts or 1% from the desired 200 VDC. This shows that the DC-Link is regulated very tightly and the Neutral point is kept balanced.

Figure 3C:
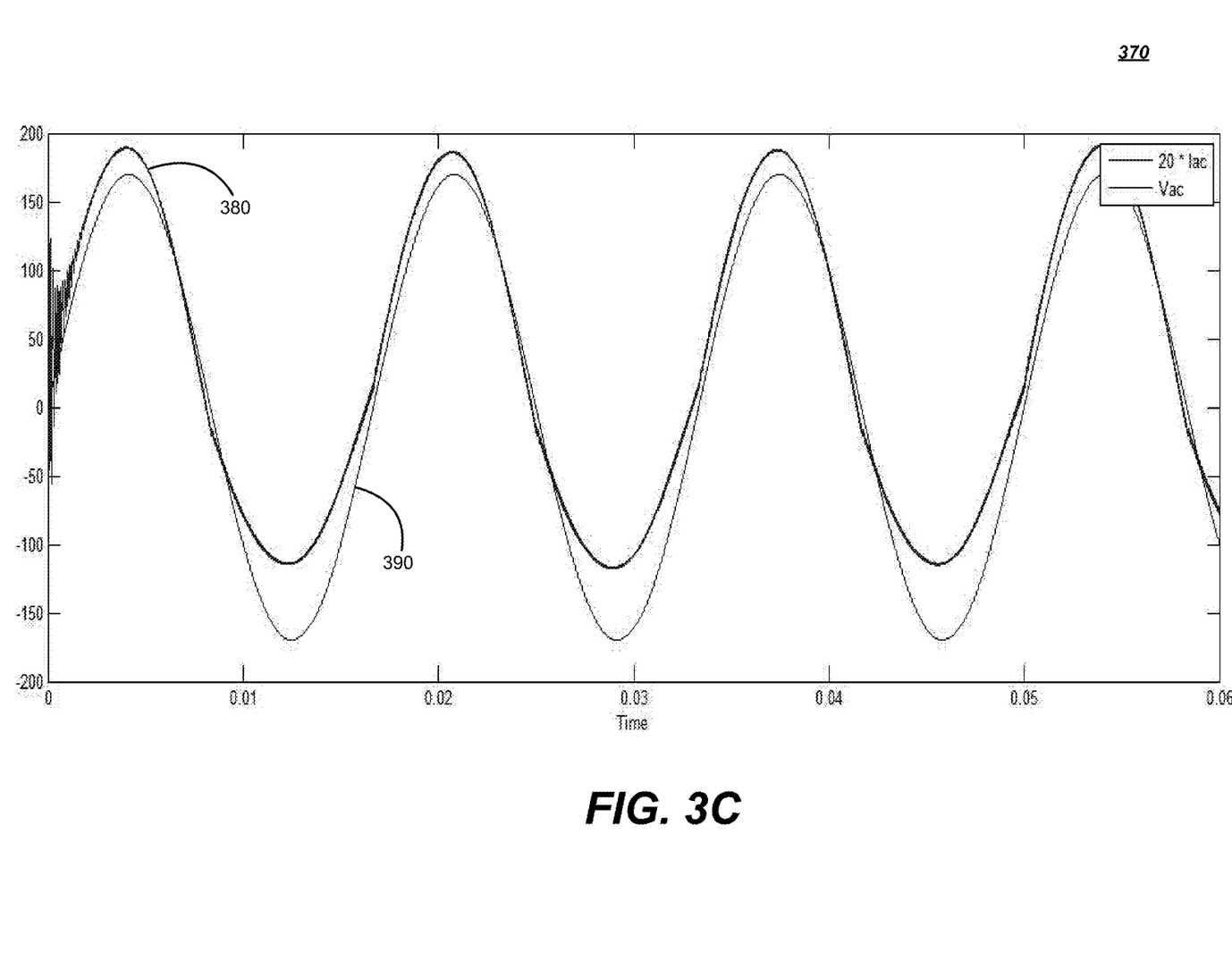
FIG. 3C is a plot of a simulation run showing the control of the AC input current and source voltage Vac, as a function of time.

FIG. 3C is a plot 370 of a simulation run showing the control of the AC input current, Iac (380), named Iin in FIGS. 1A & 2, and Vac (390), named Vin in FIGS. 1A & 2, as a function of time. This graph shows the performance of the exemplary control algorithm to control the AC input current of the PFC with a very low total harmonic distortion (THD) of less than 1%, seamless zero-cross transition of the input current, and unity power factor operation of the PFC converter.

As should be apparent, addition of AC relay provides two different modes of operation as mentioned earlier, and control of the signals via the exemplary processes shown in FIGS. 2A-C allow the same neutral point to be shared among the AC input, AC load, and common DC-Link, which results in a very low electromagnetic interference (EMI) generation/electromagnetic compatibility (EMC) issues, and very good zero crossing for AC input current of the PFC. Finally, the nonlinear control algorithm of the PFC provides full control of the DC-link voltage and AC input power factor control.

Multiple capabilities for this topology are presented:
Use of leg #1 for balancing the DC-Link in UPS operation mode.
A unique nonlinear control method to provide unity power operation, DC-link voltage regulation, and keeping neutral point balanced for nonlinear loads in the inverter side for UPS and mixed energy-AC support modes.
Low Number of components in comparison with other topologies like conventional PFC circuits and Bridgeless topology.
Very good quality input current control, no zero crossing effect and therefore very low total harmonic distortion (THD).
Low EMI because of low common-mode voltage on the parasitic capacitors.
Use of the bidirectional DC/DC converter for charging and discharging of the energy source, for example battery, and balancing the common DC-Link.
Using grid-side PFC converter leg #1 as a DC-Link balancer when DC energy source is supporting the load in the UPS mode.
Can use simple measurement circuits because of the system topology and common grounding.
Minimum number of current and voltage measurements for control purposes.
Can use similar half-bridge power structure for the input PFC and output Inverter; therefore, similar driver structure for different stage of the system to result in reduced manufacturing cost.
Capability of interleaved legs for input and output stages to increase the power rating of the unit. In other word, instead of having only one leg for input PFC, leg #1, multiple legs can be working together in an interleaving fashion to provide higher power rating. The same can be applied to the output stage as well.
Smaller size and higher efficiency in comparison with existing circuit topologies.

While the above description illustrates specific circuit elements, one of ordinary skill may replace one or more elements with alternative elements having equivalent functionality. Therefore, various modifications and changes are within the intent and scope of this disclosure. For example, some embodiments may incorporate some software components and may combine one or more hardware components such as microprocessors, microcontrollers, or digital sequential logic, etc., such as processor with one or more software components (e.g., program code, firmware, resident software, micro-code, etc.) stored in a tangible computer-readable memory device such as a tangible computer memory device, that in combination form a specifically configured apparatus that performs the functions as described herein. These combinations that form specially-programmed devices may be generally referred to herein "modules". The software component portions of the modules may be written in any computer language and may be a portion of a monolithic code base, or may be developed in more discrete code portions such as is typical in object-oriented computer languages. In addition, the modules may be distributed across a plurality of computer platforms, servers, terminals, and the like. A given module may even be implemented such that the described functions are performed by separate processors and/or computing hardware platforms.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:
1. A power conversion control system, comprising:
an AC grid input;

a controllable AC relay coupled to the AC grid input, wherein an output of the AC relay is switchable between the AC grid input and a common system ground;

controllable AC relay output switches coupled to the output of the AC relay;

a DC source input;

front end switches coupled to the DC source input;

an isolated DC/DC converter with switchable outputs, the DC/DC converter coupled to the DC source input via the front end switches;

a DC-link with a plurality of rails including a first rail, a second rail, and a shared common neutral rail, wherein DC-link output switches are coupled to the first and second rails, wherein the first and second rails are coupled to the DC/DC converter switchable outputs and also coupled to the AC relay output switches, wherein the shared common neutral rail is coupled to the DC/DC converter and the common system ground, wherein the DC-link output switches are operated as an inverter;

an output circuit coupled to the DC-link output switches, adapted to transfer power from the DC-link to a load; and a controller, providing at least one of one or more switching signals to the controllable AC relay, AC relay output switches, front end switches, switchable outputs of the DC/DC converter, and DC-link output switches to control power conversion, wherein the switching signals are based on a non-linear modification of an upper and lower half of the DC-link voltage and a desired total DC-link voltage, the modification comprising a phase lock loop signal portioned into half waves, multiplied into an output of a Proportional-Integral (PI) controller, the PI controller receiving squared values of the upper or lower half of the DC-link voltage and the desired total DC-link voltage, wherein a resulting signal is an input current command (Iin-ref) to provide unity power factor operation.

2. The system of claim 1, wherein the AC grid is single phase.

3. The system of claim 1, wherein the front end switches are arranged as a bidirectional H-bridge.

4. The system of claim 1, wherein the DC-DC converter is a unidirectional DC-DC converter.

5. The system of claim 1, wherein the controller provides power factor controller capabilities.

6. The system of claim 5, further comprising a plurality of power factor correction circuits in parallel.

7. The system of claim 1, further comprising an additional inverter connected to the first and second rails.

8. The system of claim 1, wherein the system provides at least one of an uninterruptable power supply (UPS) mode operation by providing power solely from the DC source input when the AC grid input is down and a mixed energy-AC support mode of operation by providing power from the DC source input and AC grid input via control of the switching signals.

9. The system of claim 8, wherein the controller controls an operation of the controllable AC relay to provide the uninterruptable power supply (UPS) mode operation and the mixed energy-AC support mode of operation.

10. The system of claim 1, wherein regulation of the DC-link and neutral point balancing is maintained by controlling a cycle time and timing of the switches in the system to provide a total DC ripple of less than 1% for non-linear unsymmetrical AC loads.

11. The system claim of 10, wherein the non-linear operation switching results in at least one of unity power factor operation of AC grid input, seamless zero current crossing, and very low total harmonic distortion (THD).

12. The system of claim 1, further comprising a plurality of PI controllers.

13. The system of claim 1, wherein the Iin-ref signal is further modified by an AC relay current (Iin), a proportioned (K) Iin, proportionally-integrated, AC grid input voltage, and limited to result in a binary signal for operation of the controllable AC relay output switches.

14. The system of claim 1, further comprising an AC grid connected to the AC grid input.

15. The system of claim 14, wherein the AC grid is a three-phase line.

16. The system of claim 1, further comprising a load connected to the output circuit.

17. A method for controlling an AC-AC converter with bidirectional isolated DC-DC converter, power conversion system, comprising:

coupling a controllable AC relay to an AC grid input of the system, an output of the AC relay being switchable between the AC grid input and a common system ground;

coupling controllable AC relay output switches to the output of the AC relay;

coupling bi-directional switches to an output of a DC source, the bi-directional switches being controllable to provide bi-directional power flow;

coupling an isolated DC/DC converter with switchable outputs to the DC source via the bi-directional switches;

coupling first and second rails of a DC-link to DC-link output switches, the DC/DC converter switchable outputs, and to the AC relay output switches;

coupling a shared rail of the DC-link and the DC/DC converter to the common system ground, wherein the DC-link output switches are operated as an inverter;

coupling an output circuit to the DC-link output switches to transfer power from the DC-link to a load; and providing one or more switching signals to the controllable AC relay, AC relay output switches, bi-directional switches, switchable outputs of the DC/DC converter, and DC-link output switches to control voltages in the rails of the DC-link, wherein the switching signals are based on a non-linear modification of an upper and lower half of the DC-link voltage and a desired total DC-link voltage, the modification comprising a phase lock loop signal portioned into half waves, multiplied into an output of a Proportional-Integral (PI) controller, the PI controller receiving squared values of the upper and lower half of the DC-link voltage and the desired total DC-link voltage, wherein a resulting signal is an input current command (Iin-ref) to provide unity power factor operation.

18. The method of claim 17, wherein the Iin-ref signal is further modified by an AC relay current (Iin), a proportioned (K) Iin, proportionally-integrated, AC grid input voltage, and limited to result in a binary signal for operation of the controllable AC relay output switches.

* * * * *